United States Patent
Ying-Feng

[11] Patent Number: 6,062,788
[45] Date of Patent: May 16, 2000

[54] NAIL

[75] Inventor: Hung Ying-Feng, Chang Hwa Hsien, Taiwan

[73] Assignee: Yeun Chang Hardware Tool Co., Ltd., Chang Hwa Hsien, Taiwan

[21] Appl. No.: 09/267,027

[22] Filed: Mar. 12, 1999

[51] Int. Cl.[7] .................................................. F16B 15/02
[52] U.S. Cl. ............................ 411/480; 411/5; 411/439; 411/923
[58] Field of Search ....................... 411/453, 493, 411/494, 496, 480, 923, 2, 3, 4, 5, 402, 439

[56] References Cited

U.S. PATENT DOCUMENTS

| | | | |
|---|---|---|---|
| 698,843 | 4/1902 | Miner | 411/923 |
| 768,517 | 8/1904 | Copeland | 411/494 |
| 796,299 | 8/1905 | Day | 411/923 |
| 1,698,951 | 1/1929 | Holmes | 411/453 |
| 1,846,709 | 2/1932 | Dillon | 411/496 |
| 2,353,315 | 7/1944 | Maze | 411/480 |
| 2,814,059 | 11/1957 | Lehning | 411/402 |
| 3,096,680 | 7/1963 | Dudgeon | 411/480 |
| 4,662,806 | 5/1987 | Reed | 411/2 |
| 5,372,466 | 12/1994 | O'Berry | 411/411 |
| 5,375,957 | 12/1994 | Golledge | 411/453 |

FOREIGN PATENT DOCUMENTS

| 1006129 | 9/1965 | United Kingdom | 411/2 |
|---|---|---|---|

*Primary Examiner*—B. Dayoan
*Assistant Examiner*—Clifford B Vaterlaus
*Attorney, Agent, or Firm*—Harrison & Egbert

[57] ABSTRACT

A nail having a nail head with a top surface having a plurality of protuberances formed thereon, a nail body extending from a bottom surface of the nail head, a nail tip formed at an end of the nail body opposite the nail head, and a ring portion formed between the nail head and the nail body. The ring portion has a plurality of indentations formed thereon so as to allow separation of the nail head from the nail body upon a twisting force applied to the plurality of protuberances. The nail tip has a plurality of sliced sections formed thereon. The sliced sections have differing surface areas. The sliced sections have a generally diamond-shaped configuration. A plurality of slanting ribs extend along a length of the nail body at an acute angle relative to a longitudinal axis of the nail body.

4 Claims, 7 Drawing Sheets

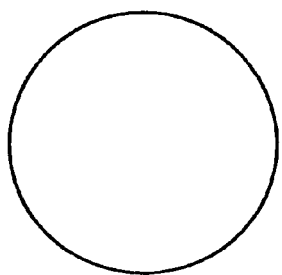
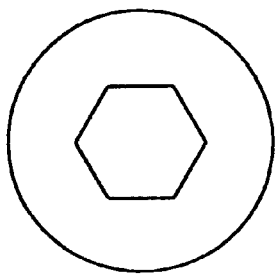
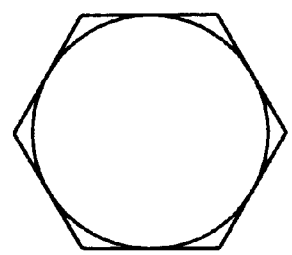
FIG.1　　　　　　FIG.2　　　　　　FIG.3
PRIOR ART　　　　PRIOR ART　　　　PRIOR ART
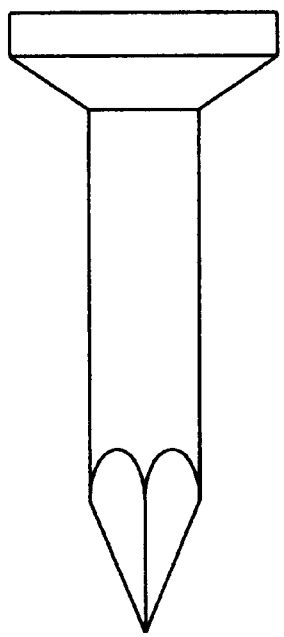
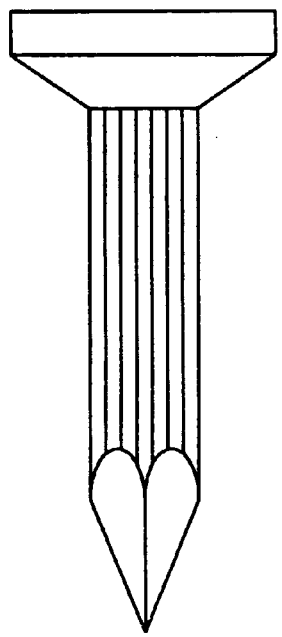
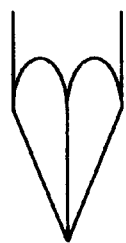
FIG.4　　　　　　FIG.5　　　　　　FIG.6
PRIOR ART　　　　PRIOR ART　　　　PRIOR ART

NAIL

FIELD OF THE INVENTION

The present invention relates generally to a nail and more particularly to an improvement of the conventional nail.

BACKGROUND OF THE INVENTION

Nails are used in abroad range of applications, especially in furniture construction, light steel frame construction and indoor mounting purposes.

The design of the common nail is defective for a variety of reasons as stated hereinafter.

The nail head, as illustrated in FIGS. 1–3, is often removed after the nail has been inserted into a material. It is often difficult to destroy or remove the nail head once the material into which the nail has been applied must be dismantled or separated. The inability to remove the nail head will make dismantling difficult because of the fixation of the nail head on the material. It is necessary to pull the entire nail from the material. As a result, the appearance of the material will have a hole formed thereon. If the nail is not removed, then it will remain on the material and will adversely affect the appearance of the material. In prior art applications, so as to allow for the removal of the nail head, the nail head has been provided with an interior hexagonal hole (as illustrated in FIG. 2) or provided with an exterior hexagonal head (as shown in FIG. 3). When an interior hexagonal hole is provided on the head of the nail, it is often difficult to remove the nail head after being inserted into the material. This is because of the small size of the hole. When an exterior hexagonal head is used, it is easy to damage the appearance of the material when tools are applied so as to remove the nail head.

The nail body usually has a smooth or ribbed surface. When the nail body is inserted into the material, the nail body will experience resistance and obstructions during the insertion of the nail body into the material. As a result, a great deal of effort must be carried out so as to properly insert the nail body into the material. When the nail body encounters obstructions or resistance in the material, the exterior surface of the material will become concave and will cause the nail head to protrude.

On a conventional nail, a tip is formed, as illustrated in FIG. 6. A common nail head is formed with diamond-shaped sliced sections which surround the tip in a plurality of sliced sections. When the nail head is inserted in the material, a hole is formed and resistance encountered. As a result, it will cause the appearance of the material to be depressed and will adversely influence the smoothness and aesthetic appearance of the material. In the prior art, nail tips can be ax-shaped as illustrated in FIG. 7. These ax-shaped nail tips cannot be used on hard materials. Another type of nail tip which is used in the prior art is awl-shaped, as illustrated in FIG. 8. The awl-shaped tip is difficult to use except when installed through the use of power tools.

SUMMARY OF THE INVENTION

The primary objective of the present invention is to provide an improved nail which includes a nail head, a nail body and a nail tip.

It is another objective of the present invention to provide a nail tip with four sliced sections formed thereon of differing sizes. As a result, the nail can be easily installed and fixed into the material. The nail head is configured so as to be easily cut off by the use of a gripping tool.

The foregoing objective, features and functions of the present invention will be more readily understood upon a thoughtful deliberation of the following detailed description of a preferred embodiment of the present invention with reference to the accompanying drawings.

BRIEF DESCRIPTION OF THE DRAWINGS

FIG. 1 shows a schematic view of a prior art round nail head.

FIG. 2 shows a schematic view of the prior art of an interior hexagonal hole formed on the nail head.

FIG. 3 shows a schematic view of an exterior hexagonal surface formed on the nail head.

FIG. 4 shows a schematic view of a prior art smooth nail body.

FIG. 5 shows a schematic view of a prior art ribbed nail body.

FIG. 6 shows a schematic view of a prior art diamond-shaped nail tip.

DETAILED DESCRIPTION OF THE INVENTION

Figure 7:
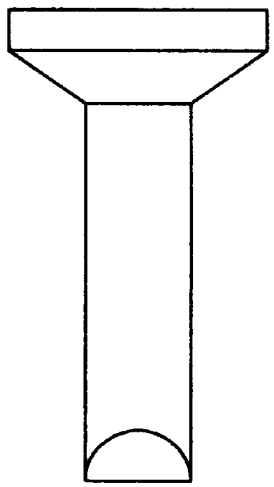
FIG. 7 shows a schematic view of a prior art ax-shaped nail tip.
Figure 8:
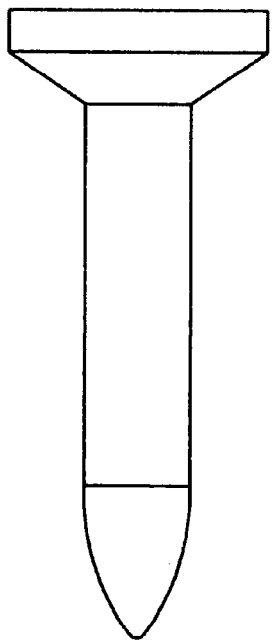
FIG. 8 shows a schematic view of a prior art awl-shaped nail tip.
Figure 9:
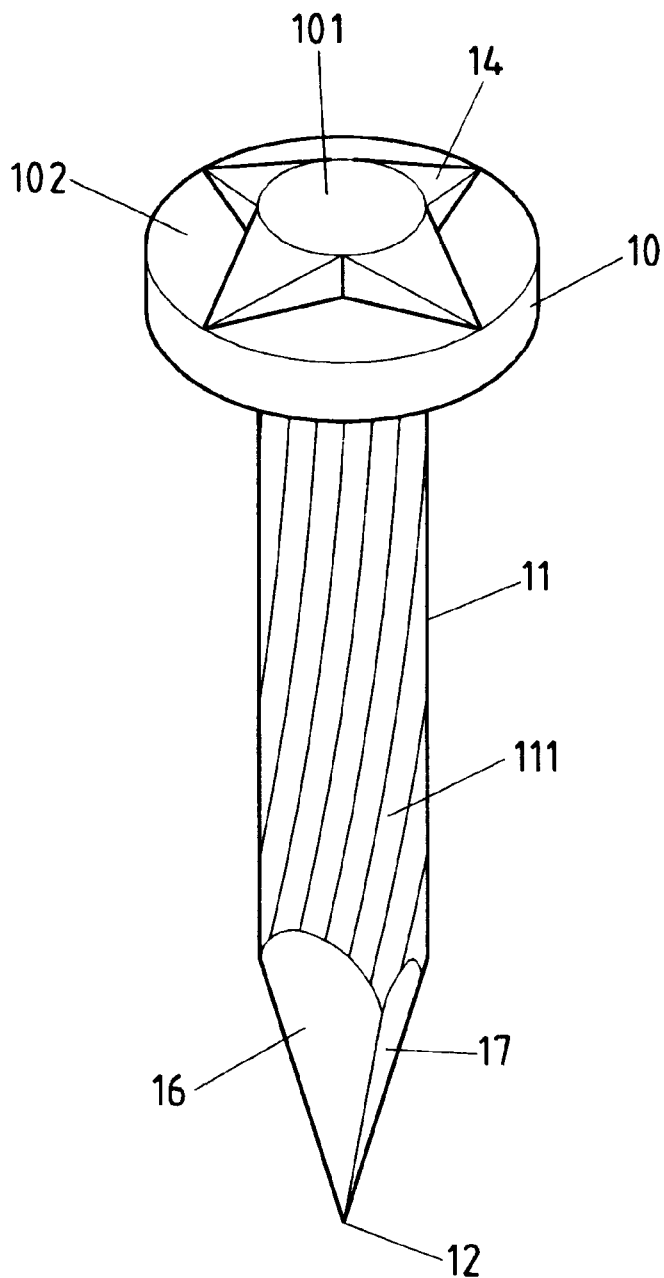
FIG. 9 shows a perspective view of the present invention.
Figure 11:
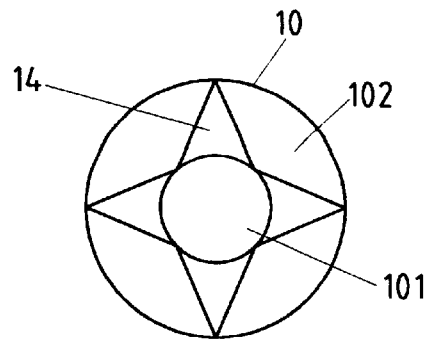
FIG. 11 show a shows plan view of the nail head of the present invention.
Figure 10:
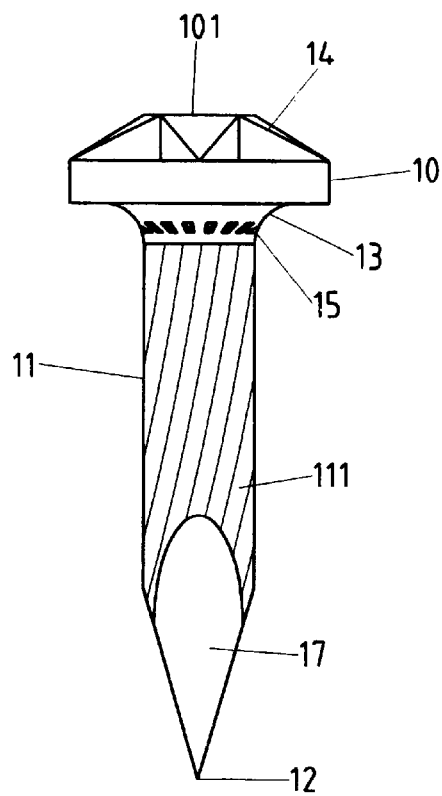
FIG. 10 shows a perspective of the present invention.

As illustrated in FIGS. 9–11, the present invention provides an improved nail having a nail head 10 with a nail body 11 extending from a bottom thereof. The nail body 11 has a nail tip formed at a bottom end opposite the nail head 10. At the connection between the bottom of the nail head 10 and the nail body 11 is formed a ring portion 13.

The top side of the nail head 10 is formed with a plurality of protuberances 14. The ring portion 13 is provided with a plurality of indentations 15. The nail tip 12 is formed of a plurality of sliced sections of differing surface areas. The nail body 11 is provided with a plurality of slanting ribs 111.

The present invention has a flat surface 101 formed centrally on the top surface of the nail head 10. The flat surface 101 has a circular configuration having a diameter which is no less than the outer diameter of the nail body 11. The plurality of protuberances 14 extend radially outwardly from the flat surface 101 and taper gradually downwardly toward the top surface of the nail head 10. A trough 102 is formed between the top surface of the nail head 10 and between respective protuberances 14.

In the present invention, the surface area of the first sliced section 16 formed on the nail tip 12 is larger than the surface area of the second sliced section 17.

The present invention has many advantages over the prior art. With respect to the nail head 10, after the nail is inserted into the material, if the nail head 10 needs to be removed, a tool can be engaged with the protuberances 14 being received within the trough 102. By rotating the nail head 10 to one side, the nail head 10 is severed from the nail body 11 by virtue of the indentations 15 formed on the ring portion 13. As such, in the present invention, it is not necessary to pull the nail head 10 outwardly. The nail head 10 can simply be removed from the surface of the material. No depression, indentation or hole will remain. Since the tool can engage the troughs formed between the plurality of protuberances 14 on the nail head 10, it is not necessary to engage the outer surfaces of the head so as to damage the surface of the material.

Figure 13:
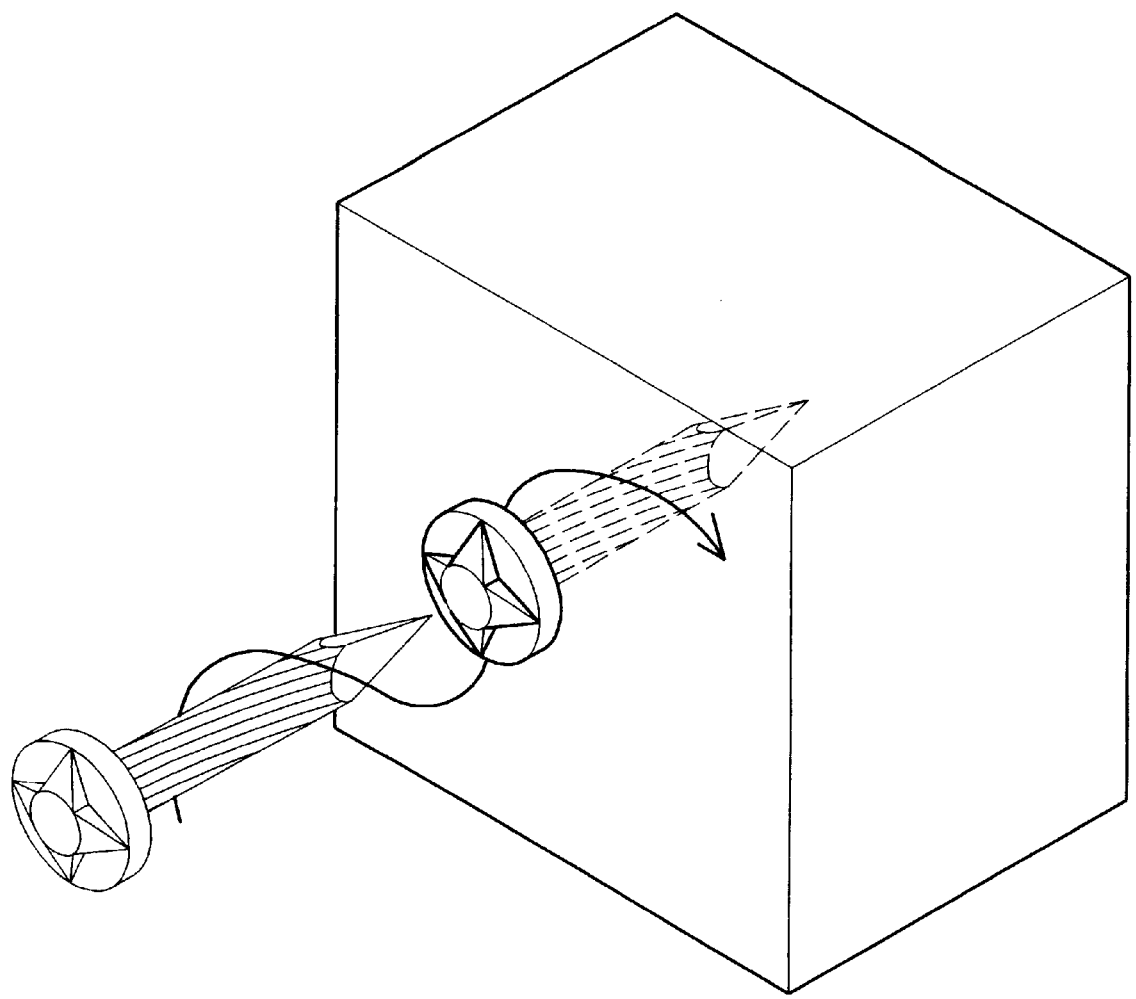
FIG. 13 shows an the installation of the nail of the present invention.
Figure 14:
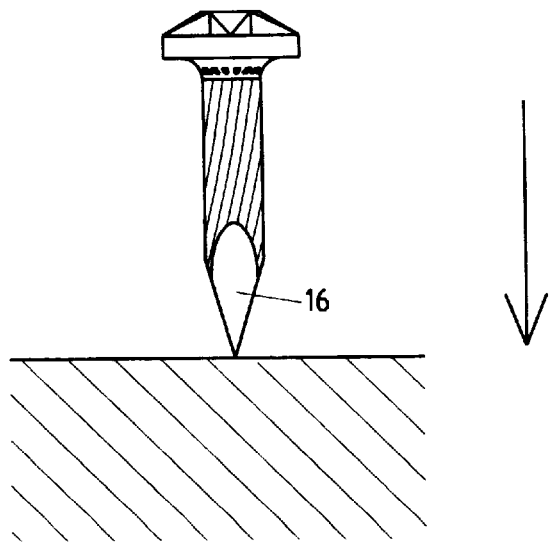
FIGS. 14A–C show the installation of the present invention into material.
Figure 14:
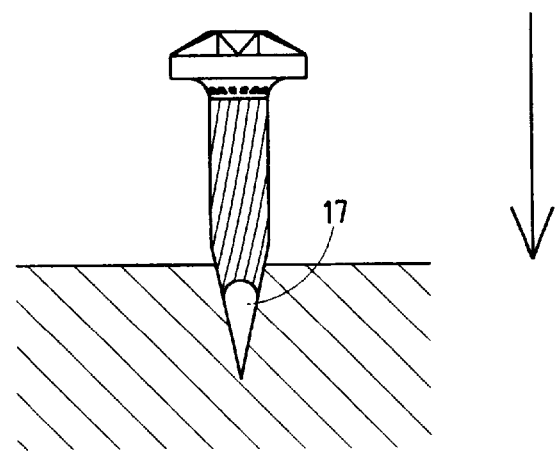
Figure 14:
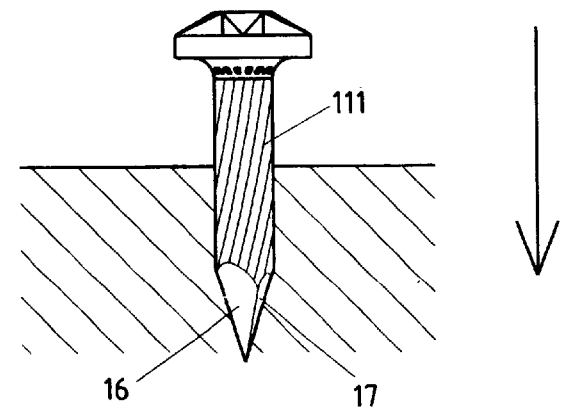
Figure 15:
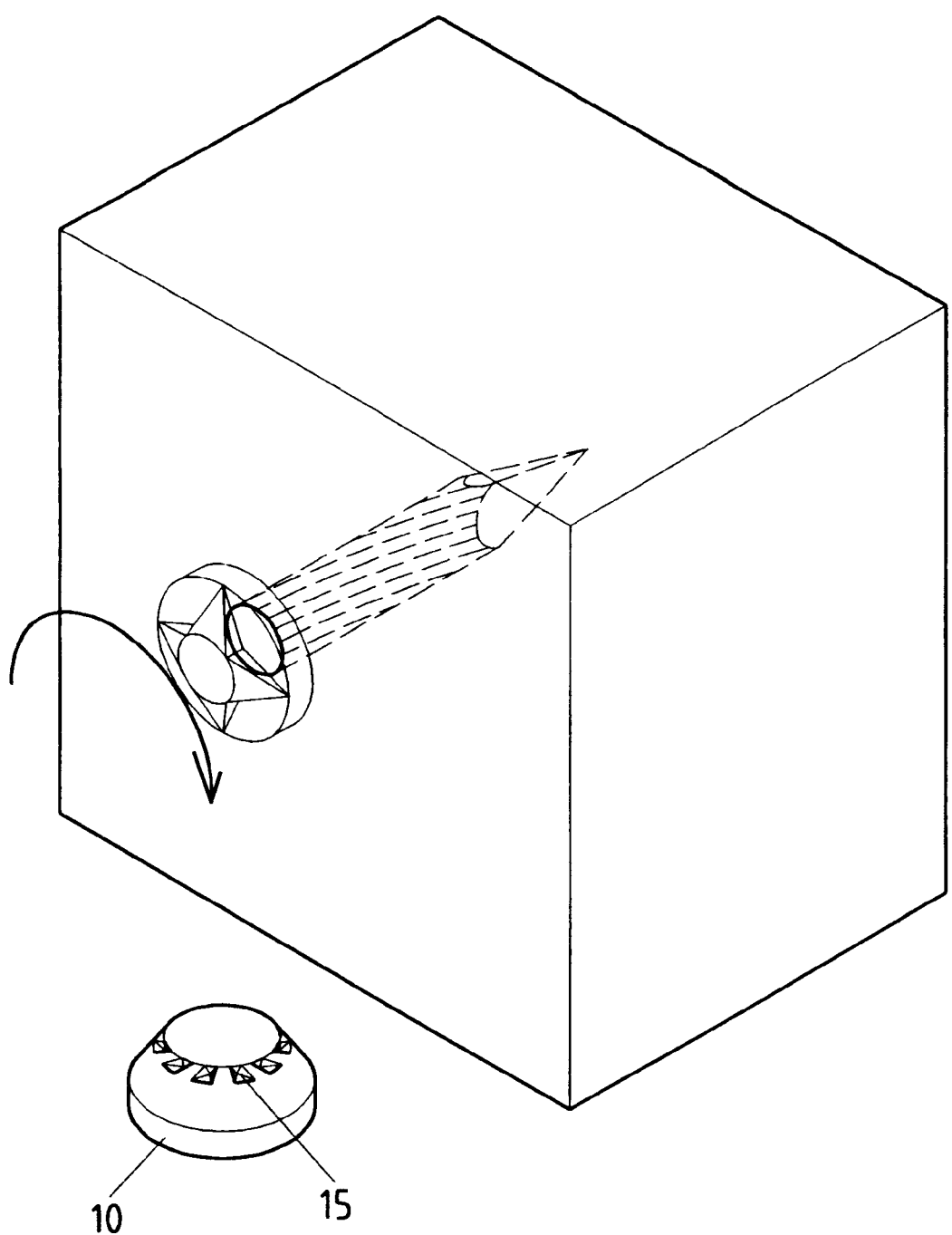
FIG. 15 illustrates the removal of the nail head in accordance with the teachings of the present invention.

The nail body 11 as illustrated in FIGS. 10, 13 and 14 has many advantages. The slanting ribs 111 of nail body 11 revolve when the nail body 11 is inserted into the material. As a result, the nail body 11 will also rotate while being inserted into the material. This serves to reduce the force of insertion and to avoid the leaning of the nail when the nail is inserted into the material. The arrangement of these slanting ribs will reduce the resistance of the material to the insertion of the nail body and will serve to fixedly retain the nail body within the material.

Figure 12:
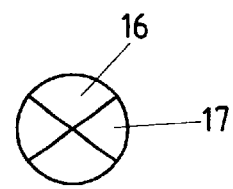
FIG. 12 shows a plan isolated bottom view of the nail tip of the present invention.

The nail tip 12 as illustrated in the FIGS. 10, 12 and 14 also have several advantages. The sliced sections 16 and 17 will combine with the action of the slanting ribs 111 of nail body 11 so as to facilitate the insertion of the nail into the material. This arrangement reduces obstructions to the insertion of the nail body and will reduce the amount of effort required to insert the nail body 11 into the material.

The present invention, because of the special construction of the nail head 10, the nail body 11 and the nail tip 12, will allow the worker to easily carry out the insertion of the nail into the material. The present invention reduces the force required to overcome the resistance of the material to the insertion of the nail. The present invention allows the nail to be fixedly received within the material.

The embodiment of the present invention described above is to be deemed in all respects as being merely illustrative and not restrictive. Accordingly, the present invention may be embodied in other specific forms without deviating from the spirit thereof. The present invention is therefore to be limited only by the scope of the appended claims.

What is claimed is:

1. A nail comprising:

a nail head having a top surface having a plurality of protrusions formed thereon;

a nail body extending from a bottom surface of said nail head;

a nail tip formed at an end of said nail body opposite said nail head, said nail tip having a plurality of sliced sections formed thereon, said plurality of sliced sections having differing surface areas, said sliced sections having a generally diamond-shaped configuration; and a ring portion formed between said nail head and said nail body, said ring portion having a plurality of indentations formed thereon so as to allow said nail head to be separated from said nail body upon the application of a twisting force onto said plurality of protuberances.

2. The nail of claim 1, said nail body having a plurality of slanting ribs extending along a length of said nail body, said slanting ribs extending at an acute angle relative to longitudinal axis of said nail body.

3. The nail of claim 1, said nail head having a flat surface formed centrally of said top surface of said nail head, said flat surface having a circular configuration and a diameter of no less than a diameter of said nail body, said plurality of protuberances extending radially outwardly and downwardly toward said top surface from a perimeter of said flat section, said plurality of protuberances and said top surface of said nail head defining a trough respectively between pairs of said plurality of protuberances.

4. The nail of claim 1, said plurality of sliced sections comprising a first sliced section and a second sliced section, said first sliced section having a larger surface area than said second sliced section.

* * * * *